(12) United States Patent
Kawashima

(10) Patent No.: US 6,542,801 B2
(45) Date of Patent: Apr. 1, 2003

(54) POWER STEERING SYSTEM

(75) Inventor: Kazuhito Kawashima, Nagaokakyo (JP)

(73) Assignee: Nippon Yusoki Co., Ltd., Kyoto (JP)

( * ) Notice: Subject to any disclaimer, the term of this patent is extended or adjusted under 35 U.S.C. 154(b) by 0 days.

(21) Appl. No.: 10/015,567

(22) Filed: Dec. 17, 2001

(65) Prior Publication Data

US 2002/0087242 A1 Jul. 4, 2002

(30) Foreign Application Priority Data

Dec. 26, 2000 (JP) ........................................ 2000-396086
Dec. 26, 2000 (JP) ........................................ 2000-396087

(51) Int. Cl.$^7$ ............................................. A01B 69/00
(52) U.S. Cl. ...................... 701/41; 180/422; 318/432; 318/433
(58) Field of Search ........................... 701/41; 180/422, 180/446; 318/432, 433

(56) References Cited

U.S. PATENT DOCUMENTS

| 4,541,499 A | 9/1985 | Yanai et al. | 180/422 |
|---|---|---|---|
| 4,658,927 A | 4/1987 | Kanazawa | 180/422 |
| 4,739,855 A | 4/1988 | Miyoshi et al. | 180/422 |
| 4,979,114 A | * 12/1990 | Oshita et al. | 701/41 |
| 6,407,524 B1 | * 6/2002 | Endo et al. | 318/432 |

FOREIGN PATENT DOCUMENTS

| EP | 0 071 909 A2 | 2/1983 |
|---|---|---|
| GB | 2 188 296 B1 | 9/1987 |
| GB | 2 216 079 B1 | 10/1989 |
| GB | 2 225 756 B1 | 6/1990 |
| JP | 10226350 | 8/1998 |
| JP | 2000203440 | 7/2000 |

* cited by examiner

Primary Examiner—William A. Cuchlinski, Jr.
(74) Attorney, Agent, or Firm—Sughrue Mion, PLLC

(57) ABSTRACT

A power steering system according to the invention includes a running speed detector 1 for detecting the running speed of a vehicle, an operating speed detector 11 for detecting the operating speed of a steering wheel which is the turning speed of the steering wheel, a controller 2 for calculating a target steering speed which is a target turning speed for a steering mechanism 14 based on the operating speed so detected and comparing an actual steering speed which is an actual turning speed by the steering mechanism 14 with the target steering speed for calculation of a deviation and a driving device 15 for driving the steering mechanism 14 in response to the deviation so calculated, the controller being configured to change a set ratio of the target steering speed to the operating speed so as to increase or decrease in response to the running speed of the vehicle.

5 Claims, 3 Drawing Sheets

POWER STEERING SYSTEM

BACKGROUND OF THE INVENTION

1. Field of the Invention

The present invention relates to an electric power steering system.

2. Description of the Related Art

As a first conventional example of a power steering system for a forklift truck, there is known a power steering system in which rear wheels disposed at a rear position of a main body of the forklift truck are used as steering wheels and in which a steering mechanism for operating the steering wheels to turn to thereby turn the vehicle itself and a steering wheel disposed at a front position of the main body of the vehicle are mechanically coupled to each other via a torque transmission mechanism consisting of a chain or a shaft. In this power steering system, the rotational torque of the steering wheel is detected by a torque sensor disposed at a rear end portion of the torque transmission mechanism, and the rear steering wheels are operated to turn as a steering motor provided on the steering mechanism is driven based on a detected value detected by the torque sensor.

As a second example of a conventional power steering system for the forklift truck, there is known a power steering system comprising, as shown in a block diagram of FIG. 5, an operating speed sensor 11 for detecting the operating speed of a steering wheel which is the turning speed thereof, an actual steering speed sensor 12 for detecting an actual operating speed which is an actual turning speed by a steering mechanism, a micro computer 13 which is a controller for calculating a target operating speed which is a target turning speed for the steering mechanism and comparing the actual steering speed detected by the actual steering speed sensor 12 with the target steering speed so calculated for calculation of a deviation and a motor a driving device 15 which is a driving device for driving a steering motor 14 provided on the steering mechanism in response to the deviation so calculated.

As a third example of a conventional power steering system for the forklift truck, there is known a power steering system comprising, as shown in a block diagram of FIG. 6, an operating angle sensor 111 for detecting the operating angle of a steering wheel which is the turning angle thereof, an actual steering angle sensor 112 for detecting an actual operating angle which is an actual turning speed by a steering mechanism or a so-called steering angle of a steering wheel, a micro computer 113 which is a controller for calculating a target operating angle which is a target turning angle for the steering mechanism based on the operating angle detected by the operating angle detecting sensor and comparing the actual steering angle detected by the actual steering angle sensor 112 with the target steering angle so calculated for calculation of a deviation and a motor a driving device 115 which is a driving device for driving a steering motor 114 provided on the steering mechanism in response to the deviation so calculated. In addition, the operating angle of the steering which is the turning angle thereof is calculated in response to the number of times of turns of the steering wheel, and there exists an established proportional relationship between the number of times of turns and the operating angle that the number of times of turns increases as the operating angle increases.

However, in the power steering system according to the first conventional example, since the steering wheel and the steering mechanism are mechanically coupled to each other, it is not easy to change the turning speed ratio between the two members.

Moreover, in the power steering system according to the second conventional example, the target steering speed for the steering mechanism is only calculated based on the simple set ratio relative to the operating speed, and in reality the turning speed ratio between the steering handle and the steering mechanism is set as a fixed value. Namely, in vehicles in general including forklift trucks, since it is important to maintain good straight line vehicle stability by preventing the wandering of a vehicle that occurs while the vehicle is running at high speed, it is the normal practice that the set ratio of the target steering speed of the steering mechanism relative to the operating speed is set as a fixed value by using the straight line vehicle stability at a high vehicle speed as a reference and that the target steering speed of the steering mechanism is calculated as a result of the multiplication of the set ratio by the operating speed.

For forklift trucks as loading vehicles which are different from those developed mainly for running, however, it is imperative to be used to load and unload freight while being run at low speed, and therefore, forklift trucks are operated back and forth restlessly and repeatedly and the steering wheel frequently needs to be turned in a condition in which the vehicle is nearly stationary as in so-called stationary steering. Then, as long as the fixed set ratio set based on the straight line vehicle stability at the high vehicle speed as a reference is used, the turning speed or operating speed of the steering wheel has to be increased in despite of the fact that the target steering speed of the steering mechanism is relatively slow, and therefore there is caused a problem that the operator gets exhausted before long after the initiation of operating the forklift truck or a muscular disorder is caused.

Moreover, in the power steering system according to the third conventional example, the target steering angle for the steering mechanism is only calculated based on the simple set ratio relative to the operating angle, and in reality the turning angle ratio between the steering handle and the steering mechanism is set as a fixed value.

Namely, in vehicles in general including forklift trucks, since it is important to maintain good straight line vehicle stability by preventing the wandering of a vehicle that occurs while the vehicle is running at high speed, it is the normal practice that the set ratio of the target steering angle of the steering mechanism relative to the operating angle is set as a fixed value by using the straight line vehicle stability at a high vehicle speed as a reference and that the target steering angle of the steering mechanism is calculated as a result of the multiplication of the set ratio by the operating speed. Note that in forklift trucks it is common that the number of times of turns of the steering wheel relative to the overall movable range of the steering mechanism is set to 5 to 8 turns.

For forklift trucks as loading vehicles which are different from those developed mainly for running, however, it is imperative to be used to load and unload freight while being run at low speed, and therefore, forklift trucks are operated back and forth restlessly and repeatedly and the steering wheel frequently needs to be turned in a condition in which the vehicle is nearly stationary as in so-called stationary steering. Then, as long as the fixed set ratio set based on the straight line vehicle stability at the high vehicle speed as a reference is used, the number of times of turns of the steering wheel needs to be increased so that the steering angle is also increased in despite of the fact that the target steering angle of the steering mechanism is relatively small, and as a result of this, there is caused a problem that the operator gets exhausted before long after the initiation of operating the forklift truck or a muscular disorder is caused.

SUMMARY OF THE INVENTION

The present invention has been made in view of the inconveniences inherent in the conventional examples.

An object of the invention is to provide a power steering system in which a set ratio of a target steering speed for a steering mechanism relative to the steering speed of a steering wheel is variable, and in which there is no risk of the operator of a forklift truck getting exhausted before long after the initiation of the operation of the vehicle or a muscular disorder being caused.

Another object of the invention is to provide a power steering system in which a set ratio of a target steering angle for a steering mechanism relative to the steering angle of a steering wheel is variable, and in which there is no risk of the operator of a forklift truck getting exhausted before long after the initiation of the operation of the vehicle or a muscular disorder being caused.

With a view to attaining the object, according to a first aspect of the invention, there is provided a power steering system comprising a running speed detector for detecting the running speed of a vehicle, an operating speed detector for detecting the operating speed of a steering wheel which is the turning speed of the steering wheel, a controller for calculating a target steering speed which is a target turning speed for a steering mechanism based on the operating speed so detected and comparing an actual steering speed which is an actual turning speed by the steering mechanism with the target steering speed for calculation of a deviation and a driving device for driving the steering mechanism in response to the deviation on so calculated, the controller being configured to change a set ratio of the target steering speed to the operating speed so as to increase or decrease in response to the running speed of the vehicle.

Namely, according to the power steering system, since the set ratio of the target steering speed relative to the operating speed is changed to be increased of decreased in response to the running speed of the vehicle by the controller, a set ratio suitable for a then running speed of the vehicle can be selected. In addition, the target steering speed of the steering mechanism which corresponds to the operating speed of the steering wheel is calculated in consideration of the running speed of the vehicle, and as a result of a deviation being calculated after the comparison of the target steering speed so calculated and the actual steering speed, the vehicle can be operated as required at the operating speed of the steering wheel which corresponds to the running speed of the vehicle or an appropriate turning speed.

According to a second aspect of the invention, there is provided a power steering system as set forth in the first aspect of the invention, wherein the controller is configured to increase the set ratio of the target steering speed to the operating speed when the vehicle is running at low speed and to decrease the set ratio when the vehicle is running at high speed.

According to the power steering system provided with the controller configured as described above, the set ratio of the target steering speed relative to the operating speed increases when the vehicle is running at low speed as in loading or unloading freight, whereas the set ratio of the target steering speed relative to the operating speed decreases when the vehicle is running at high speed as in running with no freight being loaded on the vehicle. As a result, the turning speed of the steering wheel only has to be smaller than the conventional example when the vehicle is running at low speed or the running speed of the vehicle is slow.

According to a third aspect of the invention, there is provided a power steering system comprising a running speed detector for detecting the running speed of a vehicle, an operating angle detector for detecting the operating angle of a steering wheel which is the turning angle of the steering wheel, an actual steering angle detector for detecting an actual steering angle which is an actual turning angle by a steering mechanism, a controller for calculating a target steering angle which is a target turning angle for the steering mechanism based on the operating angle so detected and comparing the target steering angle so calculated and the actual steering angle so detected for calculation of a deviation and a driving device for driving the steering mechanism in response to the deviation so calculated, the controller being configured to change a set ratio of the target steering angle to the operating angle so as to increase or decrease in response to the running speed of the vehicle.

Namely, according to the power steering system, since the set ratio of the target steering angle relative to the operating angle is changed to be increased of decreased in response to the running speed of the vehicle by the controller, a set ratio suitable for a then running speed of the vehicle can be selected. In addition, the target steering angle of the steering mechanism which corresponds to the operating angle of the steering wheel is calculated in consideration of the running speed of the vehicle, and as a result of a deviation being calculated after the comparison of the target steering angle so calculated and the actual steering angle, the vehicle can be operated as required at the operating angle of the steering wheel which corresponds to the running speed of the vehicle or with an appropriate number of times of turns.

According to a fourth aspect of the invention, there is provided a power steering system as set forth in the third aspect of the invention, wherein the controller is configured to increase the set ratio of the target steering angle to the operating angle when the vehicle is running at low speed and to decrease the set ratio when the vehicle is running at high speed.

According to the power steering system provided with the controller configured as described above, the set ratio of the target steering angle relative to the operating angle increases when the vehicle is running at low speed as in loading or unloading freight, whereas the set ratio of the target steering angle relative to the operating angle decreases when the vehicle is running at high speed as in running with no freight being loaded on the vehicle. As a result, the number of times of turns of the steering wheel only has to be smaller than the conventional example when the vehicle is running at low speed or the running speed of the vehicle is slow, thereby making it possible to reduce the steering angle.

DETAILED DESCRIPTION OF THE PRESENT INVENTION

The present invention will be described with reference to the accompanying drawings.

First embodiment

Figure 1:
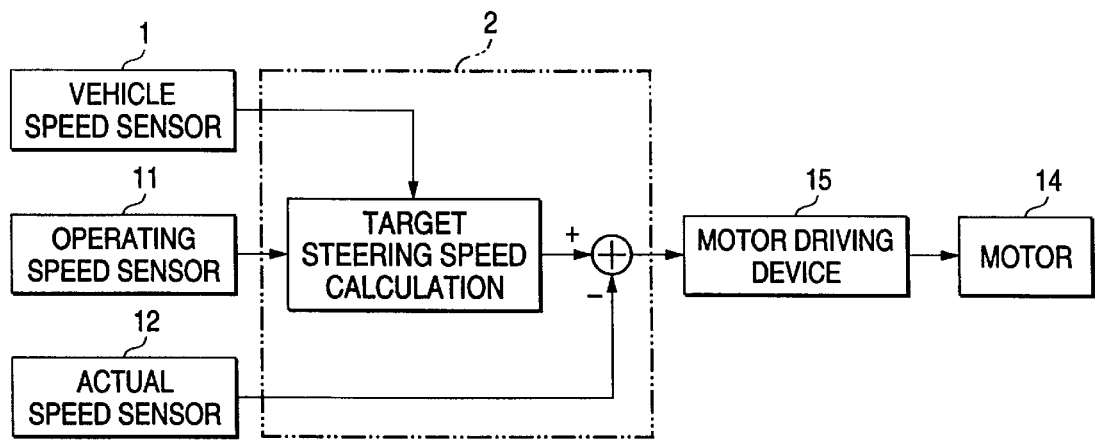
FIG. 1 is a block diagram showing configuration of a power steering system according to a first embodiment of the invention.
Figure 2:
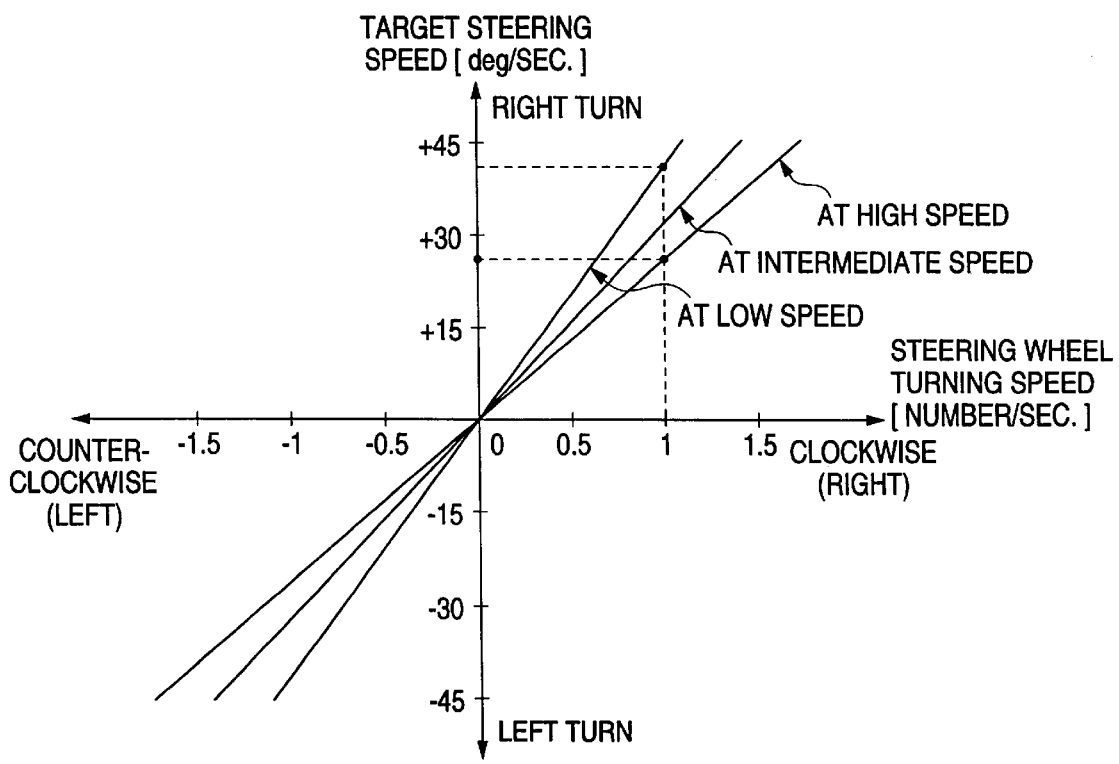
FIG. 2 is an explanatory diagram showing a relationship between the turning speed of a steering wheel which varies in response to the running speed of a vehicle and a target steering speed, according to the first embodiment of the invention.
Figure 3:
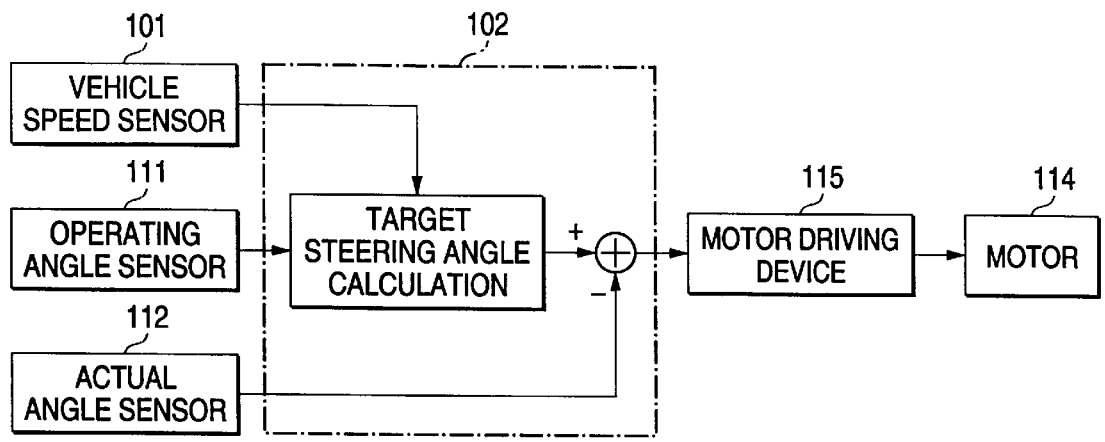
FIG. 3 is a block diagram showing configuration of a power steering system according to a second embodiment of the invention.

FIG. 1 is a block diagram showing configuration of a power steering system according to an first embodiment of the invention, and FIG. 2 is an explanatory diagram showing a relationship between the turning speed of a steering wheel which changes in response to the running speed of a vehicle and a target steering speed. Note that since the configuration of the power steering system according to the first embodiment is basically the same as that of the second conventional example, in FIG. 5 like reference numerals are imparted to components or portions which are like to or correspond to the parts or components described with reference to FIG. 1.

A power steering system according to the first embodiment of the invention comprises, as shown in the block diagram of FIG. 1, a vehicle speed sensor 1 which is a running speed detector for detecting the running speed of a vehicle, an operating speed sensor 11 which is an operating speed detector for detecting the operating speed of a steering wheel which is the turning speed of the steering wheel, an actual steering speed sensor 12 which is an actual steering speed detecting means for detecting an actual turning speed by a steering mechanism, a microcomputer 2 which is a controller for calculating a target steering speed which is a target turning speed for the steering mechanism based on the operating speed so detected and comparing the target steering speed so calculated with the actual steering speed so detected for calculation of a deviation and a motor driving device 15 which is a driving device for driving a steering motor 14 provided on the steering mechanism in response to the deviation so calculated.

In addition, in general, the vehicle speed sensor 1, the operating speed sensor 11 and the actual steering sensor 12 which are so used in the power steering system are each constructed by making use of a rotary encoder or the like. Moreover, in this first embodiment, while the power steering system comprises the actual steering speed sensor 12, the actual steering speed sensor 12 does not have to be so provided in a case where a direct-current permanent magnet steering motor is used for the steering motor 14 because an actual turning speed by the steering mechanism can be calculated through an operation based on voltage and current values to be applied.

Then, the microcomputer 12 has a configuration for changing a set ratio of the target steering speed to the operating speed such that the set ratio of the target steering speed relative to the operating speed increases higher than a set ratio for an intermediate running speed of a vehicle when the vehicle is running at low speed, whereas the set ratio of the target steering speed relative to the operating speed decreases lower than the intermediate running speed of the vehicle when the vehicle is running at high speed. Namely, the microcomputer 2 incorporates therein a database such as shown in the explanatory diagram of FIG. 2, that is, a data base for presenting a relative relationship between the turning speed of the steering wheel and the target steering speed which change in response to the running speed of the vehicle, and a set ratio is read from the database which provides a target steering speed of in the order of +25 degrees/sec as a result of calculation if the turning speed of the steering wheel when the vehicle is running at high speed is 1 turn/sec, whereas a set ratio is read from the database which provides a target steering speed of in the order of +41 degrees/sec when the vehicle is running at low speed even if the turning speed of the steering wheel is 1 turn/sec.

Due to this, in the power steering system according to the invention, the microcomputer 12 automatically and suitably changes the set ratio of the target steering speed relative to the operating speed so as to increase or decrease in response to the running speed of the vehicle, whereby the target steering speed of the steering mechanism which corresponds to the steering speed of the steering wheel is calculated in consideration of the running speed of the vehicle as a set ratio suitable for a then running speed of the vehicle is selected in an appropriate fashion. Then, in this microcomputer 2, as a result that a deviation is calculated after comparison between the target steering speed and the actual steering speed, the vehicle is allowed to operate as required at the turning speed of the steering wheel which corresponds to the running speed of the vehicle or an appropriate operating speed.

Consequently, according to the power steering comprising the controller configured as described above, with a set ratio for an intermediate running speed of the vehicle as in transporting freight being set as a reference set ratio, when the vehicle is running at low speed as in loading or unloading freight, the set ratio of the target steering speed relative to the operating speed increases higher than the set ratio for the intermediate vehicle running speed, and in contrast, when the vehicle is running at high speed as in running with no freight loaded thereon, the set ratio of the target steering speed relative to the operating speed decreases lower than the set ratio for the intermediate vehicle running speed. As a result, when the vehicle is running at low speed or the vehicle running speed is slow, only a slow rotating speed of the steering wheel is required.

Next, an operation of the power steering system according to the first embodiment of the present invention will be described. Namely, in turning the vehicle in one direction or turning it repeatedly in both directions, the steering wheel is first turned by the operator, and an operating speed corresponding to the turning speed is detected by the operating speed sensor 11. Then, an operating speed is detected, the microcomputer 12 calculates a set ratio corresponding to the running speed of the vehicle detected by the vehicle speed sensor 1 and calculates a target steering speed for the steering mechanism after multiplication of the set ratio so calculated by the operating speed. The microcomputer 12 then compares the target steering speed so calculated with an actual steering speed detected by the actual steering speed sensor 12 for calculation of a deviation and thereafter designates the deviation so calculated to the motor driving device 15.

Due to this, the motor driving device 15 drives the steering motor 14 based on the deviation so designated thereto by the microcomputer 2 such that the deviation becomes zero. Then, the motor driving device 15 continues to drive the steering motor 14 until the actual steering speed of the steering mechanism detected by the actual steering speed sensor 12 becomes the target steering speed, and as a result, the target steering speed is attained.

Incidentally, according to the first embodiment, while the set ratio of the steering speed relative to the turning speed of the steering wheel is set in three stages; high, intermediate and low, the set ratio is not limited to the three stages but may be set so as to vary continuously in response to the running speed of the vehicle. Moreover, it is needless to say that the steering motor 14 may be of an alternate or direct current type. Furthermore, while the first embodiment of the invention has been described on the premise that a target vehicle on which the power steering system of the invention is equipped is a forklift truck, the target vehicle on which the power steering system is equipped is not limited to the forklift truck but it is natural that the power steering system constructed as described above may be equipped on any other types of vehicles in general than the forklift truck.

Second Embodiment

Figure 4:
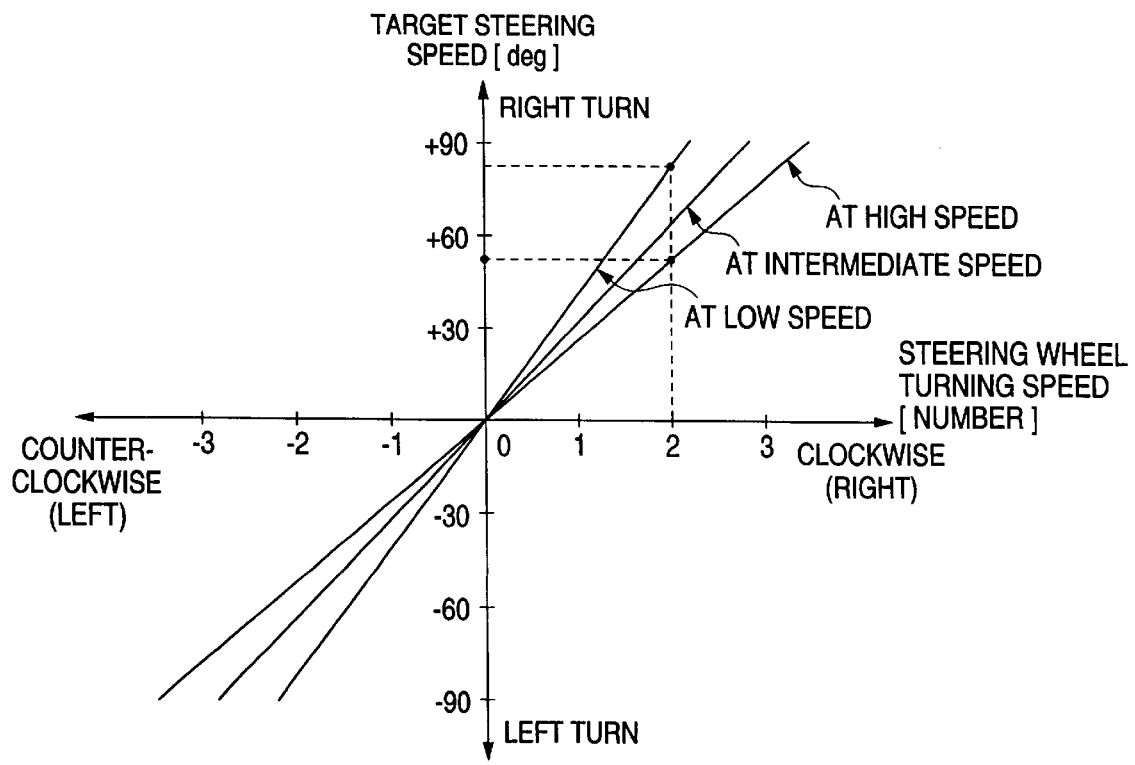
FIG. 4 is an explanatory diagram showing a relationship between the turning angle of a steering wheel which varies in response to the running speed of a vehicle and a target steering angle, according to the second embodiment of the invention.
Figure 5:
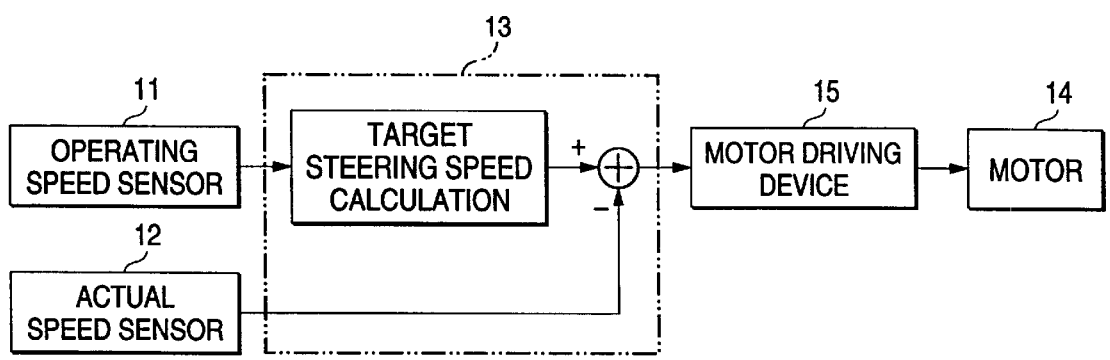
FIG. 5 is a block diagram showing the configuration of a power steering system according to a second conventional example.
Figure 6:
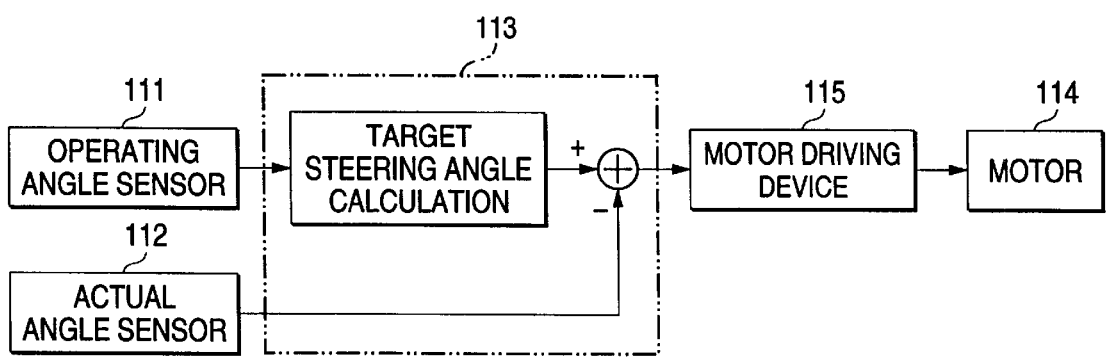
FIG. 6 is a block diagram showing the configuration of a power steering system according to a third conventional example.

FIG. 4 is a block diagram showing the configuration of a power steering system according to an second embodiment of the invention, and FIG. 5 is an explanatory diagram showing a relationship between the number of times of turns a steering wheel which changes in response to the running speed of a vehicle and a target steering angle. Note that since the configuration of the power steering system according to the second embodiment is basically the same as that of the second conventional example, in FIG. 6 like reference numerals are imparted to components or portions which are like to or correspond to the parts or components described with reference to FIG. 4.

A power steering system according to the second embodiment of the invention comprises, as shown in the block diagram of FIG. 4, a vehicle speed sensor 101 which is a running speed detector for detecting the running speed of a vehicle, an operating angle sensor 111 which is an operating angle detector for detecting the operating angle of a steering wheel which is the turning angle of the steering wheel, an actual steering angle sensor 112 which is an actual steering angle detecting means for detecting an actual turning angle by a steering mechanism, a microcomputer 102 which is a controller for calculating a target steering angle which is a target turning angle for the steering mechanism based on the operating angle so detected and comparing the target steering angle so calculated with the actual steering angle so detected for calculation of a deviation and a motor driving device 115 which is a driving device for driving a steering motor 114 provided on the steering mechanism in response to the deviation so calculated.

In addition, the steering angle of the steering angle which is the turning angle thereof is calculated in response to the number of times of turns of the steering wheel, and there exists an established proportional relationship between the number of times of turns and the operating angle that the number of times of turns increases as the operating angle increases. In addition, as this occurs, in general, the vehicle speed sensor 101, the operating speed sensor 111 and the actual steering sensor 112 which are so used in the power steering system are each constructed by making use of a rotary encoder or the like.

Then, the microcomputer 112 has a configuration for changing a set ratio of the target steering angle to the operating angle such that the set ratio of the target steering angle relative to the operating angle increases higher than a set ratio for an intermediate running speed of a vehicle when the vehicle is running at low speed, whereas the set ratio of the target steering angle relative to the operating angle decreases lower than the intermediate running speed of the vehicle when the vehicle is running at high speed. Namely, the microcomputer 102 incorporates therein a database such as shown in the explanatory diagram of FIG. 5, that is, a database for presenting a relative relationship between the number of times of turns of the steering wheel and the target steering angle which change in response to the running speed of the vehicle, and a set ratio is read from the database which provides a target steering angle of about 50 degrees as a result of calculation if the number of times of turns of the steering wheel when the vehicle is running at high speed is 2 turns, whereas a set ratio is read from the database which provides a target steering angle of about 80 degrees when the vehicle is running at low speed even if the number of times of tunes of the steering wheel is 2 turns.

Due to this, in the power steering system according to the invention, the microcomputer 102 automatically and suitably changes the set ratio of the target steering angle relative to the operating angle so as to increase or decrease in response to the running speed of the vehicle, whereby the target steering angle of the steering mechanism which corresponds to the steering angle of the steering wheel is calculated in consideration of the running speed of the vehicle as a set ratio suitable for a then running speed of the vehicle is selected in an appropriate fashion. Then, in this microcomputer 102, as a result of a deviation being calculated after comparison between the target steering angle and the actual steering angle, the vehicle is allowed to operate as required at the turning angle of the steering wheel which corresponds to the running speed of the vehicle or with an appropriate number of times of turns.

Consequently, according to the power steering comprising the controller configured as described above, with a set ratio for an intermediate running angle of the vehicle as in transporting freight being set as a reference set ratio, when the vehicle is running at low speed as in loading or unloading freight, the set ratio of the target steering angle relative to the operating angle increases higher than the set ratio for the intermediate vehicle running speed, and in contrast, when the vehicle is running at high speed as in running with no freight loaded thereon, the set ratio of the target steering angle relative to the operating angle decreases lower than the set ratio for the intermediate vehicle running speed. As a result, when the vehicle is running at low speed or the vehicle running speed is slow, the number of times of turns of the steering wheel only has to be small, thereby making it possible to reduce the operating angle of the steering wheel.

Next, the operation of the power steering system according to the present invention will be described. Namely, in turning the vehicle in one direction or turning it repeatedly in both directions, the steering wheel is first turned by the operator, and an operating angle corresponding to the turning angle is detected by the operating speed sensor 11. Then, an operating angle is detected, the microcomputer 102 calculates a set ratio corresponding to the running speed of the vehicle detected by the vehicle speed sensor 101 and calculates a target steering angle for the steering mechanism after multiplication of the set ratio so calculated by the detected operating angle. The microcomputer 102 then compares the target steering angle so calculated with an actual steering angle detected by the actual steering angle sensor 112 for calculation of a deviation and thereafter designates the deviation so calculated to the motor driving device 115.

Due to this, the motor driving device 115 drives the steering motor 114 based on the deviation so designated thereto by the microcomputer 102 such that the deviation becomes zero. Then, the motor driving device 115 continues to drive the steering motor 114 until the actual steering angle of the steering mechanism detected by the actual steering angle sensor 112 becomes the target steering angle, and as a result, the target steering angle is attained.

Incidentally, according to the second embodiment, while the set ratio of the steering angle relative to the number of times of turns of the steering wheel is set in three stages; high, intermediate and low, the set ratio is not limited to the three stages but may be set so as to vary continuously in response to the running speed of the vehicle. Moreover, it is needless to say that the steering motor 114 may be of an alternate or direct current type. Furthermore, while the second embodiment of the invention has been described on the premise that a target vehicle on which the power steering system of the invention is equipped is a forklift truck, the target vehicle on which the power steering system is equipped is not limited to the forklift truck but it is natural that the power steering system constructed as described above may be equipped on any other types of vehicles in general than the forklift truck.

As has been described heretofore, according to the power steering system as set forth in the first aspect of the invention, since varying the set ratio of the target steering speed relative to the operating speed so as to increase or decrease in response to the running speed of the vehicle is executed by the controller, the target steering speed of the steering mechanism corresponding to the operating speed is calculated while giving the running speed of the vehicle consideration, and as a result that a deviation is calculated after comparison between the target steering speed and the actual steering speed, the vehicle is allowed to operate as required at the turning speed of the steering wheel which corresponds to the running speed of the vehicle or an appropriate operating speed.

Then, according to the power steering system as set forth in the second aspect of the invention, in a case where the controller is configured such that when the vehicle is running at low speed the set ratio of the target steering speed relative to the operating speed increases, whereas when the vehicle is running at high speed the set of the target steering speed relative to the operating speed decreases, the set ratio of the target steering speed relative to the operating speed increases when the vehicle is running at low speed as in loading or unloading freight, whereas the set ratio of the target steering speed relative to the operating speed decreases when the vehicle is running at high speed as in running with no freight being loaded thereon. Consequently, when the vehicle is running at low speed, the rotating speed of the steering wheel only has to be slow.

Namely, in the power steering system comprising the controller configured according to the invention, since the set ratio of the target steering speed of the steering mechanism relative to the operating speed of the steering wheel is variable, the turning speed of the steering wheel required in turning the vehicle repeatedly in both directions while the vehicle is running at low speed can be made slower than the conventional examples, obviating a risk of the operator getting exhausted before long after the initiation of the operation of the vehicle or the muscular disorder or the like being caused. In addition, the turning speed of the steering wheel which is suitable for maintaining good straight vehicle stability while suppressing the wandering at higher speeds can also be secured at the same time. Due to this, with the invention, a superior advantage can be obtained that the vehicle can be operated to run stably without being affected by different running speeds of the vehicle.

As has been described heretofore, according to the power steering system as set forth in the third aspect of the invention, since varying the set ratio of the target steering angle relative to the operating angle so as to increase or decrease in response to the running speed of the vehicle is executed by the controller, the target steering angle of the steering mechanism corresponding to the operating angle is calculated while giving the running speed of the vehicle consideration, and as a result of a deviation being calculated after comparison between the target steering angle and the actual steering angle, the vehicle is allowed to operate as required at the turning angle of the steering wheel which corresponds to the running speed of the vehicle or with an appropriate number of times of turns thereof.

Then, according to the power steering system as set forth in the fourth aspect of the invention, in a case where the controller is configured such that when the vehicle is running at low speed the set ratio of the target steering angle relative to the operating angle increases, whereas when the vehicle is running at high speed the set of the target steering angle relative to the operating angle decreases, the set ratio of the target steering angle relative to the operating angle increases when the vehicle is running at low speed as in loading or unloading freight, whereas the set ratio of the target steering angle relative to the operating angle decreases when the vehicle is running at high speed as in running with no freight being loaded thereon. Consequently, when the vehicle is running at low speed, the number of times of turns of the steering wheel only has to be small, thereby making it possible to reduce the steering angle.

Namely, in the power steering system comprising the controller configured according to the invention, since the set ratio of the target steering angle of the steering mechanism relative to the operating angle of the steering wheel is variable, the number of times of turns of the steering wheel required in turning the vehicle repeatedly in both directions while the vehicle is running at low speed can be reduced to a lower level than the conventional examples, obviating a risk of the operator getting exhausted before long after the initiation of the operation of the vehicle or the muscular disorder or the like being caused. In addition, the number of times of turns of the steering wheel which is suitable for maintaining good straight vehicle stability while suppressing the wandering at higher speeds can also be secured at the same time. Due to this, with the invention, a superior advantage can be obtained that the vehicle can be operated to run stably without being affected by different running speeds of the vehicle.

What is claimed is:

1. A power steering system comprising:
    a running speed detector for detecting a running speed of a vehicle;
    an operating speed detector for detecting an operating speed of a steering wheel being the turning speed of the steering wheel;
    a controller for calculating a target steering speed being a target turning speed for a steering mechanism based on the operating speed detected, the controller for comparing an actual steering speed being an actual turning speed by the steering mechanism with the target steering speed to calculate a deviation; and
    a driving device for driving the steering mechanism in response to the deviation calculated,
    wherein the controller changes a set ratio of the target steering speed to the operating speed to increase or decrease in response to the running speed of the vehicle.

2. The power steering system as set forth in claim 1, wherein the controller increases the set ratio of the target steering speed to the operating speed when the vehicle is running at a low speed and decreases the set ratio when the vehicle is running at a high speed.

3. The power steering system as set forth in claim 1, further comprising an actual steering speed detector for detecting the actual steering speed being the actual turning speed by the steering mechanism.

4. The power steering system as set forth in claim 1, wherein the controller increases the set ratio of the target steering angle to the operating angle when the vehicle is running at a low speed and decreases the set ratio when the vehicle is running at a high speed.

5. A power steering system comprising:

a running speed detector for detecting a running speed of a vehicle, an operating angle detector for detecting an operating angle of a steering wheel being a turning angle of the steering wheel;

an actual steering angle detector for detecting an actual steering angle being an actual turning angle by a steering mechanism, a controller for calculating a target steering angle being a target turning angle for the steering mechanism based on the operating angle detected, the controller for comparing the target steering angle calculated with the actual steering angle detected to calculate a deviation; and a driving device for driving the steering mechanism in response to the deviation calculated, wherein the controller changes a set ratio of the target steering angle to the operating angle to increase or decrease in response to the running speed of the vehicle.

* * * * *